(12) United States Patent
Choi (10) Patent No.: US 12,210,352 B2
(45) Date of Patent: Jan. 28, 2025

(54) SYSTEM AND METHOD FOR CONTROLLING DOCKING OF UNMANNED VEHICLE

(71) Applicants: Hyundai Motor Company, Seoul (KR); Kia Corporation, Seoul (KR)

(72) Inventor: Byoung Il Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 239 days.

(21) Appl. No.: 17/988,198

(22) Filed: Nov. 16, 2022

(65) Prior Publication Data
US 2023/0409038 A1    Dec. 21, 2023

(51) Int. Cl.
G05D 1/00    (2024.01)
H04W 4/46    (2018.01)
H04W 12/06    (2021.01)

(52) U.S. Cl.
CPC ......... *G05D 1/0225* (2013.01); *G05D 1/0022* (2013.01); *H04W 4/46* (2018.02); *H04W 12/06* (2013.01)

(58) Field of Classification Search
CPC ..... G05D 1/0225; G05D 1/0022; H04W 4/46; H04W 12/06
See application file for complete search history.

(56) References Cited

U.S. PATENT DOCUMENTS

| | | | |
|---|---|---|---|
| 9,527,605 B1 * | 12/2016 | Gentry | G05D 1/0094 |
| 9,857,791 B2 * | 1/2018 | Krishnamoorthy | G08G 5/025 |
| 10,370,102 B2 * | 8/2019 | Boykin | H04R 1/406 |
| 10,800,548 B2 * | 10/2020 | Wang | B64F 1/222 |
| 2018/0074485 A1 * | 3/2018 | Krishnamoorthy | G08G 5/0069 |
| 2023/0219697 A1 | 7/2023 | Hwang et al. | |
| 2023/0249761 A1 | 8/2023 | Hwang et al. | |
| 2023/0256850 A1 | 8/2023 | Ha et al. | |

FOREIGN PATENT DOCUMENTS

| | | |
|---|---|---|
| KR | 10-2023-0108865 A | 7/2023 |
| KR | 10-2023-0118462 A | 8/2023 |
| KR | 10-2023-0123526 A | 8/2023 |

OTHER PUBLICATIONS

Z. Guo, J. Cao, X. Wang, Y. Zhang, B. Niu and H. Li, "UAVA: Unmanned Aerial Vehicle Assisted Vehicular Authentication Scheme in Edge Computing Networks," in IEEE Internet of Things Journal, vol. 11, No. 12, pp. 22091-22106, 15 Jun. 15, 2024, (Year: 2024).*

Chase C. Murray et al., 2015. The Flying Sidekick Traveling Salesman Problem: Optimization of Drone-Assisted Parcel Delivery. Transportation Research Part C:Emerging Technologies, 54, 86-109.

* cited by examiner

*Primary Examiner* — Gertrude Arthur Jeanglaude
(74) *Attorney, Agent, or Firm* — MORGAN, LEWIS & BOCKIUS LLP (57) ABSTRACT

A system for controlling docking of an unmanned vehicle is provided. The system includes terrestrial mobility movable on the ground, an unmanned vehicle that detects the terrestrial mobility, and a server that transmits a docking request signal to the terrestrial mobility and the unmanned vehicle to dock, receives information for a plurality of authentication from the terrestrial mobility and the unmanned vehicle, and controls the unmanned vehicle to dock with the terrestrial mobility based on the information for the plurality of authentication.

20 Claims, 7 Drawing Sheets

SYSTEM AND METHOD FOR CONTROLLING DOCKING OF UNMANNED VEHICLE

CROSS-REFERENCE TO RELATED APPLICATION

This application claims the benefit of priority to Korean Patent Application No. 10-2022-0067005, filed in the Korean Intellectual Property Office on May 31, 2022, the entire contents of which are incorporated herein by reference.

TECHNICAL FIELD

The present disclosure relates to a system and a method for controlling docking of an unmanned vehicle.

BACKGROUND

Recently, an unmanned vehicle has been used in various fields such as logistics delivery, facility observation, military reconnaissance, outsider intrusion monitoring, hazardous area measurement, fire response, and weather observation. As a distance or time when the unmanned vehicle is able to fly is limited because of operating using its battery, it is common to dock (connect) with terrestrial mobility (or a ground transportation means or a ground movement means) to operate the unmanned vehicle. Thus, it is required to develop a technology capable of safely docking the unmanned vehicle with the terrestrial mobility.

SUMMARY

The present disclosure has been made to solve the above-mentioned problems occurring in the prior art while advantages achieved by the prior art are maintained intact.

An aspect of the present disclosure provides a system and a method for controlling docking of an unmanned vehicle to safely dock the unmanned vehicle with terrestrial mobility.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling docking of an unmanned vehicle may include a terrestrial mobility movable on the ground, an unmanned vehicle that detects the terrestrial mobility, and a server that transmits a docking request signal to the terrestrial mobility and the unmanned vehicle to dock, receives information for a plurality of authentication from the terrestrial mobility and the unmanned vehicle, and controls the unmanned vehicle to dock with the terrestrial mobility based on the information for the plurality of authentication.

The server may transmit docking requirement information to the unmanned vehicle and the terrestrial mobility, after transmitting the docking request signal.

The docking requirement information may include docking location coordinates, a unique authentication number, and terrestrial mobility information.

The server may determine whether a first distance between the unmanned vehicle and the terrestrial mobility is less than a predefined distance, when the unmanned vehicle and the terrestrial mobility move to a docking location.

The predefined distance may include a distance where it is possible for the unmanned vehicle and the terrestrial mobility to perform vehicle-to-vehicle (V2V) communication.

The unmanned vehicle may calculate a second distance from the terrestrial mobility, when moving to the docking location.

The terrestrial mobility may calculate a third distance from the unmanned vehicle, when moving to the docking location.

The server may request the unmanned vehicle and the terrestrial mobility to share unique authentication numbers, when a difference between the second distance and the first distance is less than or equal to a first threshold and a difference between the third distance and the first distance is less than or equal to the first threshold.

The unmanned vehicle may receive a unique authentication number from the terrestrial mobility through V2V communication, may determine whether the unique authentication number previously received from the server and the unique authentication number received from the terrestrial mobility are identical to each other, and in response to determination that the unique authentication number previously received from the server and the unique authentication number received from the terrestrial mobility are identical to each other, the unmanned vehicle may transmit the determined result to the server.

The terrestrial mobility may receive a unique authentication number from the unmanned vehicle through V2V communication, determines whether the unique authentication number previously received from the server and the unique authentication number received from the unmanned vehicle are identical to each other, and in response to determination that the unique authentication number previously received from the server and the unique authentication number received from the unmanned vehicle the terrestrial mobility may transmit the determined result to the server.

The server may determine whether the difference between the second distance and the first distance is less than or equal to a second threshold and whether the difference between the third distance and the first distance is less than or equal to the second threshold, when receiving determined results.

The server may transmit a control signal requesting authentication for docking to the unmanned vehicle, when the difference between the second distance and the first distance is less than or equal to the second threshold and the difference between the third distance and the first distance is less than or equal to the second threshold.

The unmanned vehicle may determine whether terrestrial mobility information received from the server and terrestrial mobility information detected by the unmanned vehicle are identical to each other.

In response to determination that the terrestrial mobility information received from the server and the terrestrial mobility information detected by the unmanned vehicle are identical to each other, the unmanned vehicle may determine the terrestrial mobility as a target to dock and may attempt to dock with the terrestrial mobility.

The server may receive the terrestrial mobility information detected by the unmanned vehicle from the unmanned vehicle, when the difference between the second distance and the first distance is less than or equal to the second threshold and the difference between the third distance and the first distance is less than or equal to the second threshold.

The server may receive terrestrial mobility information detected by the unmanned vehicle from the unmanned vehicle, when the difference between the second distance and the first distance is less than or equal to the second threshold and the difference between the third distance and the first distance is less than or equal to the second threshold.

The server may transmit a control signal for causing the unmanned vehicle to attempt to dock with the terrestrial mobility to the unmanned vehicle, when determining that the terrestrial mobility information detected by the unmanned vehicle and the terrestrial mobility information obtained by the server are identical to each other.

The unmanned vehicle may transmit a normal docking complete signal to the server, when docking with the terrestrial mobility is completed.

The terrestrial mobility may transmit a normal docking complete signal to the server, when docking with the unmanned vehicle is completed.

According to another aspect of the present disclosure, a method for controlling docking of an unmanned vehicle may include transmitting, by a server, a docking request signal to terrestrial mobility and an unmanned vehicle to dock, receiving, by the server, information for a plurality of authentication from the terrestrial mobility and the unmanned vehicle, and controlling, by the server, the unmanned vehicle to dock with the terrestrial mobility based on the plurality of authentication.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
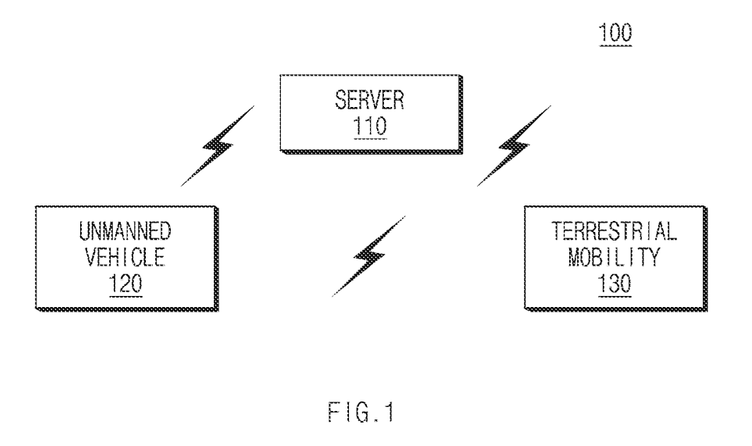
FIG. 1 is a drawing illustrating a configuration of a system for controlling docking of an unmanned vehicle according to an embodiment of the present disclosure.

FIG. 1 is a drawing illustrating a configuration of a system for controlling docking of an unmanned vehicle according to an embodiment of the present disclosure.

As shown in FIG. 1, a system 100 for controlling docking of an unmanned vehicle according to an embodiment of the present disclosure may include a server 110, an unmanned vehicle 120, and terrestrial mobility 130.

The server 110 may search for terrestrial mobility and unmanned vehicles, which are capable of docking. and may specify the terrestrial mobility and the unmanned vehicle to dock. The server 110 may transmit a docking request signal and a unique authentication number to an unmanned vehicle 120 and terrestrial mobility 130 and may receive information for a plurality of authentication from the unmanned vehicle 120 and the terrestrial mobility 130, thus controlling the unmanned vehicle 120 to dock with the terrestrial mobility 130 based on the information for the plurality of authentication. According an embodiment, the server 110 may perform the plurality of authentication using the information for the plurality of authentication such that the terrestrial mobility 130 may dock with the at least one unmanned vehicle 120. A detailed description refers to FIG. 2.

The unmanned vehicle 120 may perform vehicle-to-vehicle (V2V) communication with the terrestrial mobility 130 and may dock with the terrestrial mobility 130. A detailed description refers to FIG. 3.

The terrestrial mobility 130 may include a means movable on the ground and may perform V2V communication with the unmanned vehicle 120. According an embodiment, the terrestrial mobility 130 may include a vehicle, a purpose built vehicle (PBV), a Boston Dynamics-made robot dog, a biped robot, or the like. A detailed description refers to FIG. 4.

Figure 2:
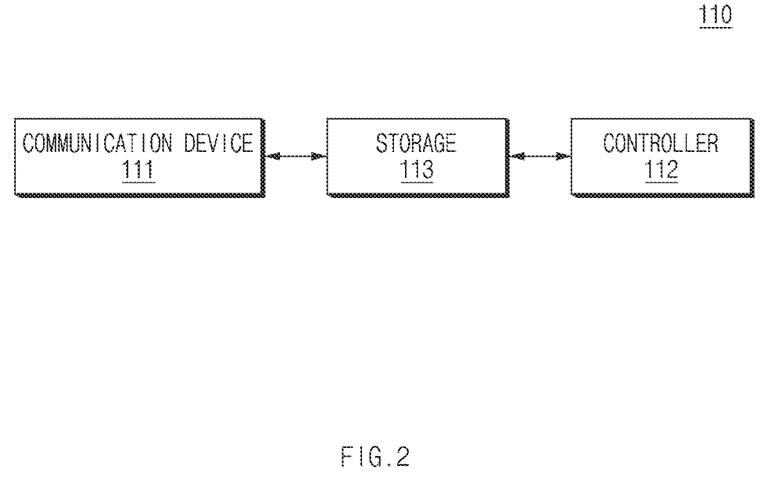
FIG. 2 is a block diagram illustrating a configuration of a server according to an embodiment of the present disclosure.

FIG. 2 is a block diagram illustrating a configuration of a server according to an embodiment of the present disclosure.

As shown in FIG. 2, a server 110 may include a communication device 111, storage 112, and a controller 113.

The communication device 111 may perform wireless communication with an unmanned vehicle 120 and terrestrial mobility 130 of FIG. 1. As an example, the communication device 111 may communicate with the unmanned vehicle 120 and the terrestrial mobility 130 in various wireless communication schemes such as wireless-fidelity (Wi-Fi), wireless broadband (WiBro), global system for mobile communication (GSM), code division multiple access (CDMA), wideband CDMA (WCDMA), universal mobile telecommunication system (UMTS), time division multiple access (TDMA), and long term evolution (LTE).

The storage 112 may store at least one algorithm which calculates or executes various commands for an operation of the server 110 according to an embodiment of the present disclosure. The storage 112 may include at least one of a flash memory, a hard disc, a memory card, a read-only memory (ROM), a random access memory (RAM), an electrically erasable and programmable ROM (EEPROM), a programmable ROM (PROM), a magnetic memory, a magnetic disc, or an optical disc.

The controller 113 may be implemented by various processing devices, such as a microprocessor, embedding a semiconductor chip or the like capable of calculating or executing various commands, and may control an operation of the server 110 according to an embodiment of the present disclosure.

The controller 113 may search for terrestrial mobility and unmanned vehicles, which are capable of docking, and may specify the terrestrial mobility and the unmanned vehicle to dock. The controller 113 may transmit a docking request signal to the terrestrial mobility and the unmanned vehicle. In addition, the controller 113 may generate, obtain, and store docking requirement information required for docking of the terrestrial mobility and the unmanned vehicle and may transmit the docking requirement information to the terrestrial mobility and the unmanned vehicle. Herein, the docking requirement information may include coordinates of a docking location, a unique authentication number (e.g., a one-time unique authentication number), and terrestrial mobility information. The terrestrial mobility information may be information associated with the terrestrial mobility, which may include unique information (e.g., a vehicle number, a VIN, a bar code, a QR code, or the like) of the terrestrial mobility, appearance information (e.g., a vehicle type, a vehicle color, a vehicle size, or the like) of the terrestrial mobility, or information about a surrounding terrain in which the terrestrial mobility is located. The controller 113 may obtain information about a surrounding terrain based on a satellite photography map or an aerial photography map.

The controller 113 may identify real-time locations of the unmanned vehicle and the terrestrial mobility and may calculate a first distance between the unmanned vehicle and the terrestrial mobility based on the real-time locations.

The controller 113 may determine whether the first distance is less than a predefined distance. Herein, the predefined distance may include a distance where it is possible for the unmanned vehicle and the terrestrial mobility to perform V2V communication.

When determining that the first distance is less than the predefined distance, the controller 113 may request an unmanned vehicle 120 and terrestrial mobility 130 of FIG. 1 to share the real-time locations. In addition, the controller 113 may receive a second distance and a third distance respectively calculated from the unmanned vehicle 120 and the terrestrial mobility 130. Herein, the second distance may be a distance between the unmanned vehicle 120 and the terrestrial mobility 130, which is calculated by the unmanned vehicle 120, and the third distance may be a distance between the terrestrial mobility 130 and the unmanned vehicle 120, which is calculated by the terrestrial mobility 130.

The controller 113 may determine whether a difference between the second distance and the first distance is less than or equal to a first threshold and whether a difference between the third distance and the first distance is less than or equal to the first threshold. When the difference between the second distance and the first distance is less than or equal to the first threshold and the difference between the third distance and the first distance is less than or equal to the first threshold, the controller 113 may request the unmanned vehicle 120 and the terrestrial mobility 130 to share unique authentication numbers.

When receiving the result of determining that the unique authentication numbers shared by the unmanned vehicle 120 and the terrestrial mobility 130 are identical to each other from the unmanned vehicle 120 and the terrestrial mobility 130, the controller 113 may determine whether the difference between the second distance and the first distance is less than or equal to a second threshold and whether the difference between the third distance and the first distance is less than or equal to the second threshold. Herein, the second threshold may be less than or equal to the first threshold, and the second threshold may refer to a minimum distance where it is possible for the unmanned vehicle 120 to obtain terrestrial mobility information.

According to an embodiment, when determining that the difference between the second distance and the first distance is less than or equal to the second threshold and that the difference between the third distance and the first distance is less than or equal to the second threshold, the controller 113 may transmit a control signal requesting authentication to the unmanned vehicle 120.

Furthermore, according to another embodiment, when the difference between the second distance and the first distance is less than or equal to the second threshold and the difference between the third distance and the first distance is less than or equal to the second threshold, the controller 113 may receive terrestrial mobility information detected by the unmanned vehicle 120 from the unmanned vehicle 120. The controller 113 may determine whether the terrestrial mobility information detected by the unmanned vehicle 120 and previously obtained terrestrial mobility information are identical to each other.

According an embodiment, the controller 113 may determine whether unique information (e.g., a vehicle number) of terrestrial mobility, which is detected by the unmanned vehicle 120, and previously obtained unique information of the terrestrial mobility 130 are identical to each other. Furthermore, the controller 113 may determine whether an appearance shape of the terrestrial mobility, which is detected by the unmanned vehicle 120, and a previously obtained appearance shape of the terrestrial mobility 130 are identical to each other. According an embodiment, the controller 113 may determine whether terrain information around the terrestrial mobility 130, which is detected by the unmanned vehicle 120, and previously obtained terrain information around the terrestrial mobility 130 are identical to each other.

When determining that terrestrial mobility information detected by the unmanned vehicle 120 and the previously obtained terrestrial mobility information are identical to each other, the controller 113 may transmit a control signal for causing the unmanned vehicle 120 to attempt to dock with the terrestrial mobility to the unmanned vehicle 120.

When receiving normal docking signals from the unmanned vehicle 120 and the terrestrial mobility 130, the controller 113 may determine that normal docking of the unmanned vehicle 120 and the terrestrial mobility 130 is completed and may delete terrestrial mobility information.

Figure 3:
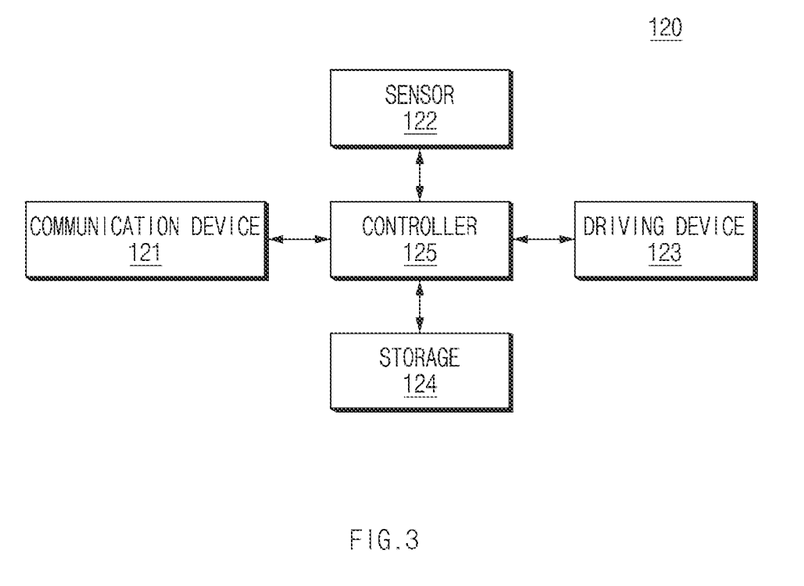
FIG. 3 is a block diagram illustrating a configuration of an unmanned vehicle according to an embodiment of the present disclosure.

FIG. 3 is a block diagram illustrating a configuration of an unmanned vehicle according to an embodiment of the present disclosure.

As shown in FIG. 3, an unmanned vehicle 120 according to an embodiment of the present disclosure may include a communication device 121, a sensor 122, a driving device 123, storage 124, and a controller 125.

The communication device 121 may perform wireless communication with a server 110 and terrestrial mobility 130 of FIG. 1. According to an embodiment of the present disclosure, the communication device 121 may perform vehicle-to-vehicle (V2V) communication with the terrestrial mobility 130. The communication device 121 may communicate with the server 110 and the terrestrial mobility 130 in various wireless communication schemes such as wireless-fidelity (Wi-Fi), wireless broadband (WiBro), global system for mobile communication (GSM), code division multiple access (CDMA), wideband CDMA (WCDMA), universal mobile telecommunication system (UMTS), time division multiple access (TDMA), and long term evolution (LTE).

The sensor 122 may obtain environmental information around the unmanned vehicle 120. According an embodiment, the sensor 122 may sense terrestrial mobility information. As an example, the sensor 122 may sense unique information and appearance information of terrestrial mobility located around the unmanned vehicle 120. To this end, the sensor 122 may include an image sensor, a light detection and ranging (LiDAR), a radar, and the like.

The driving device 123 may perform an operation under control of the controller 125 for flight of an unmanned vehicle and docking with terrestrial mobility.

The storage 124 may store at least one algorithm which calculates or executes various commands for an operation of the terrestrial mobility according to an embodiment of the present disclosure. The storage 124 may include at least one of a flash memory, a hard disc, a memory card, a read-only memory (ROM), a random access memory (RAM), an electrically erasable and programmable ROM (EEPROM), a programmable ROM (PROM), a magnetic memory, a magnetic disc, or an optical disc.

The controller 125 may be implemented by various processing devices, such as a microprocessor, embedding a semiconductor chip or the like capable of calculating or executing various commands, and may control an operation of the unmanned vehicle 120 according to an embodiment of the present disclosure.

The controller 125 may receive a docking request signal and docking requirement information from the server 110. When receiving the docking requirement information from the server 110, the controller 125 may move to a docking location based on docking location coordinates included in the docking requirement information.

When receiving the request to share a real-time location from the server 110, the controller 125 may perform V2V communication to transmit a real-time location of the unmanned vehicle 120 to the terrestrial mobility 130 and receive a location of the terrestrial mobility 130 from the terrestrial mobility 130.

The controller 125 may calculate a second distance between the unmanned vehicle 120 and the terrestrial mobility 130 based on the location of the unmanned vehicle 120 and the location of the terrestrial mobility 130, which is received from the terrestrial mobility 130. When the second distance is calculated, the controller 125 may transmit the second distance to the server 110.

When receiving the request to share the unique authentication number with the terrestrial mobility 130 from the server 110, the controller 125 may transmit the unique authentication number, received from the server 110, to the terrestrial mobility 130 through V2V communication and may receive a unique authentication number from the terrestrial mobility 130.

When determining that the unique authentication number received from the terrestrial mobility 130 is identical to the unique authentication number previously received from the server 110, the controller 125 may transmit the determined result to the server 110.

Furthermore, when receiving a request for authentication for docking from the server 110, the controller 125 may determine whether the previously received terrestrial mobility information and the terrestrial mobility information sensed by the sensor 122 are identical to each other. The controller 125 may recognize the terrestrial mobility information, sensed by the sensor 122, by means of an image processing or feature point extraction scheme.

According an embodiment, the controller 125 may determine whether unique information (e.g., a vehicle number) of terrestrial mobility, which is sensed by the sensor 122, is identical to previously obtained unique information of the terrestrial mobility 130. Furthermore, the controller 125 may determine whether an appearance shape of the terrestrial mobility, which is sensed by the sensor 122, and a previously obtained appearance shape of the terrestrial mobility 130 are identical to each other. Furthermore, the controller 125 may determine whether terrain information around the terrestrial mobility 130, which is sensed by the sensor 122, is identical to previously received terrain information around the terrestrial mobility 130.

When determining that the previously received terrestrial mobility information and the terrestrial mobility information sensed by the sensor 122 are identical to each other, the controller 125 may determine the terrestrial mobility 130 as a docking target and may attempt to dock with the terrestrial mobility 130. According an embodiment, the controller 125 may control the unmanned vehicle 120 to land in a docking area where a certain area of terrestrial mobility is ensured and attempt to dock with the terrestrial mobility. As an example, the docking area may include an area having a width and length of certain centimeters (cm) and at least one docking area may be provided in the terrestrial mobility 130. As an example, the controller 125 may control the unmanned vehicle 120 to land on the roof, hood, or the like of the terrestrial mobility 130 and attempt to dock with the terrestrial mobility 130.

When the docking is completed, the controller 125 may transmit a normal docking signal to the server 110 and may delete previously received terrestrial mobility information.

Figure 4:
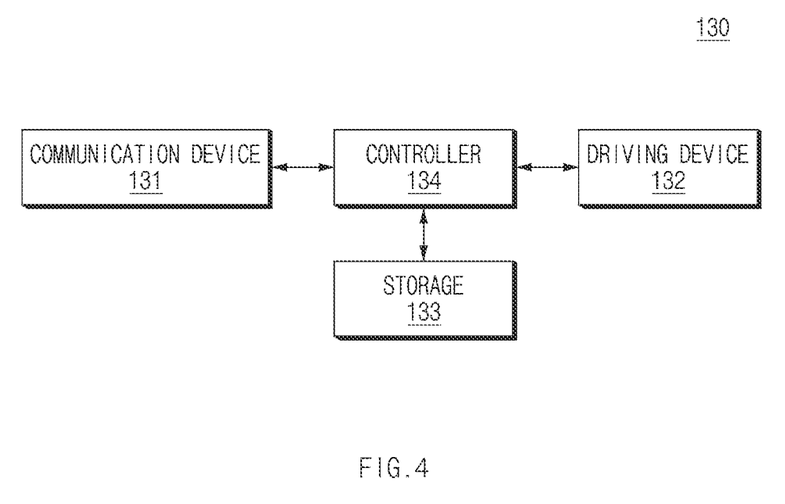
FIG. 4 is a block diagram illustrating a configuration of terrestrial mobility according to an embodiment of the present disclosure.

FIG. 4 is a block diagram illustrating a configuration of terrestrial mobility according to an embodiment of the present disclosure.

As shown in FIG. 4, terrestrial mobility 130 according to an embodiment of the present disclosure may include a communication device 131, a driving device 132, storage 133, and a controller 134.

The communication device 131 may perform wireless communication with a server 110 and an unmanned vehicle 120 of FIG. 1. According to an embodiment of the present disclosure, the communication device 131 may perform V2V communication with the unmanned vehicle 120. The communication device 131 may communicate with the server 110 and the unmanned vehicle 120 in various wireless communication schemes such as wireless-fidelity (Wi-Fi), wireless broadband (WiBro), global system for mobile communication (GSM), code division multiple access (CDMA), wideband CDMA (WCDMA), universal mobile telecommunication system (UMTS), time division multiple access (TDMA), and long term evolution (LTE).

The driving device 132 may perform an operation under control of the controller 134 for movement of the terrestrial mobility 130, transportation of goods, and docking with the unmanned vehicle 120.

The storage 133 may store at least one algorithm which calculates or executes various commands for an operation of the terrestrial mobility 130 according to an embodiment of the present disclosure. The storage 133 may include at least one of a flash memory, a hard disc, a memory card, a read-only memory (ROM), a random access memory (RAM), an electrically erasable and programmable ROM (EEPROM), a programmable ROM (PROM), a magnetic memory, a magnetic disc, or an optical disc.

The controller 134 may be implemented by various processing devices, such as a microprocessor, embedding a semiconductor chip or the like capable of calculating or executing various commands, and may control an operation of the terrestrial mobility 130 according to an embodiment of the present disclosure.

The controller 134 may receive a docking request signal and docking requirement information from the server 110. When receiving the docking requirement information from the server 110, the controller 134 may move to a docking location based on docking location coordinates included in the docking requirement information.

When receiving the request to share a real-time location from the server 110, the controller 134 may perform V2V communication to transmit a real-time location of the terrestrial mobility 130 to the unmanned vehicle 120 and receive a location of the unmanned vehicle 120 from the unmanned vehicle 120.

The controller 134 may calculate a third distance between the unmanned vehicle 120 and the terrestrial mobility 130 based on the location of the terrestrial mobility 130 and the location of the unmanned vehicle 120, which is received from the unmanned vehicle 120. When the third distance is calculated, the controller 134 may transmit the third distance to the server 110.

When receiving the request to share the unique authentication number with the unmanned vehicle 120 from the server 110, the controller 134 may transmit the unique authentication number, received from the server 110, to the unmanned vehicle 120 through V2V communication and may receive a unique authentication number from the unmanned vehicle 120.

When determining that the unique authentication number received from the unmanned vehicle 120 is identical to the unique authentication number previously received from the server 110, the controller 134 may transmit the determined result to the server 110.

When receiving the request to transmit the previously received unique authentication number to the server 110, the controller 134 may transmit the previously received unique authentication number to the server 110.

Furthermore, when the docking with the unmanned vehicle 120 is completed, the controller 134 may transmit a normal docking signal to the server 110 and may delete previously received terrestrial mobility information.

Figure 5:
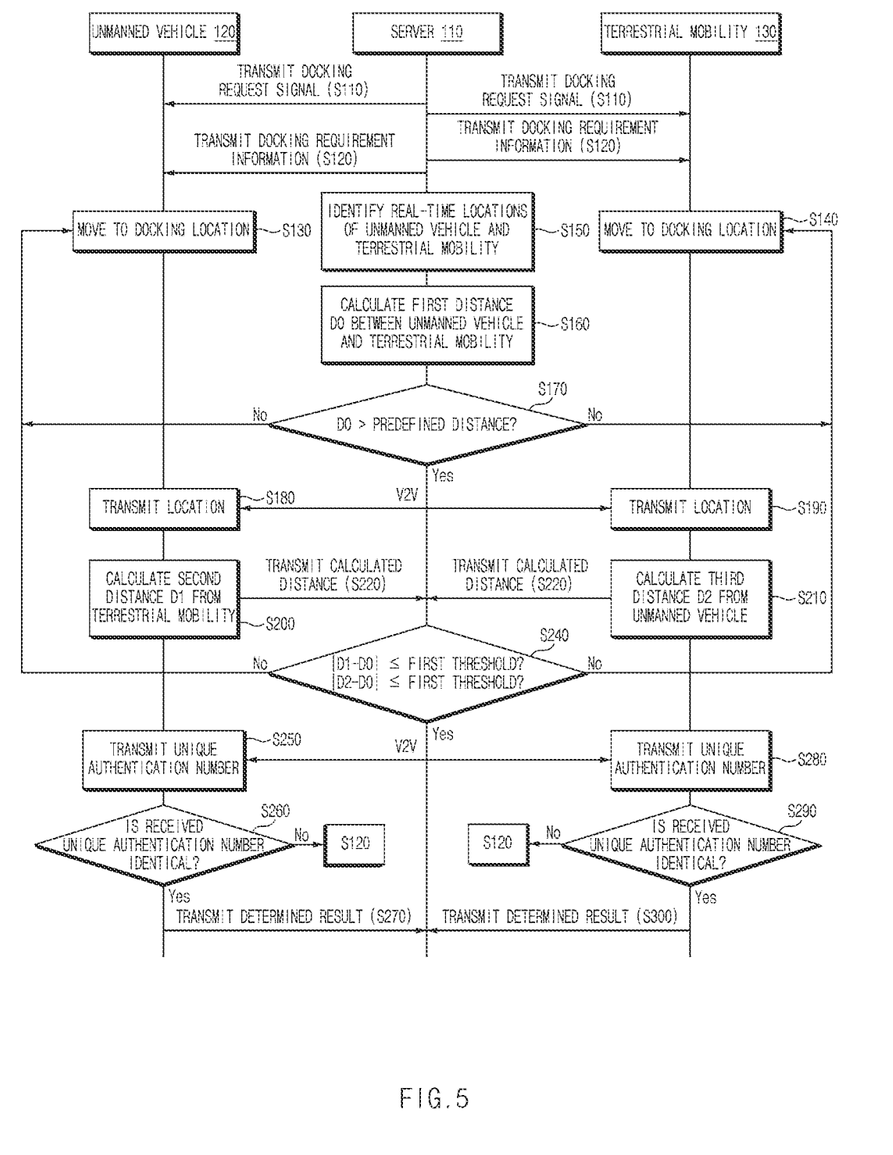
FIGS. 5 and 6 are signal sequence diagrams illustrating a method of controlling docking of an unmanned vehicle according to an embodiment of the present disclosure.
Figure 6:
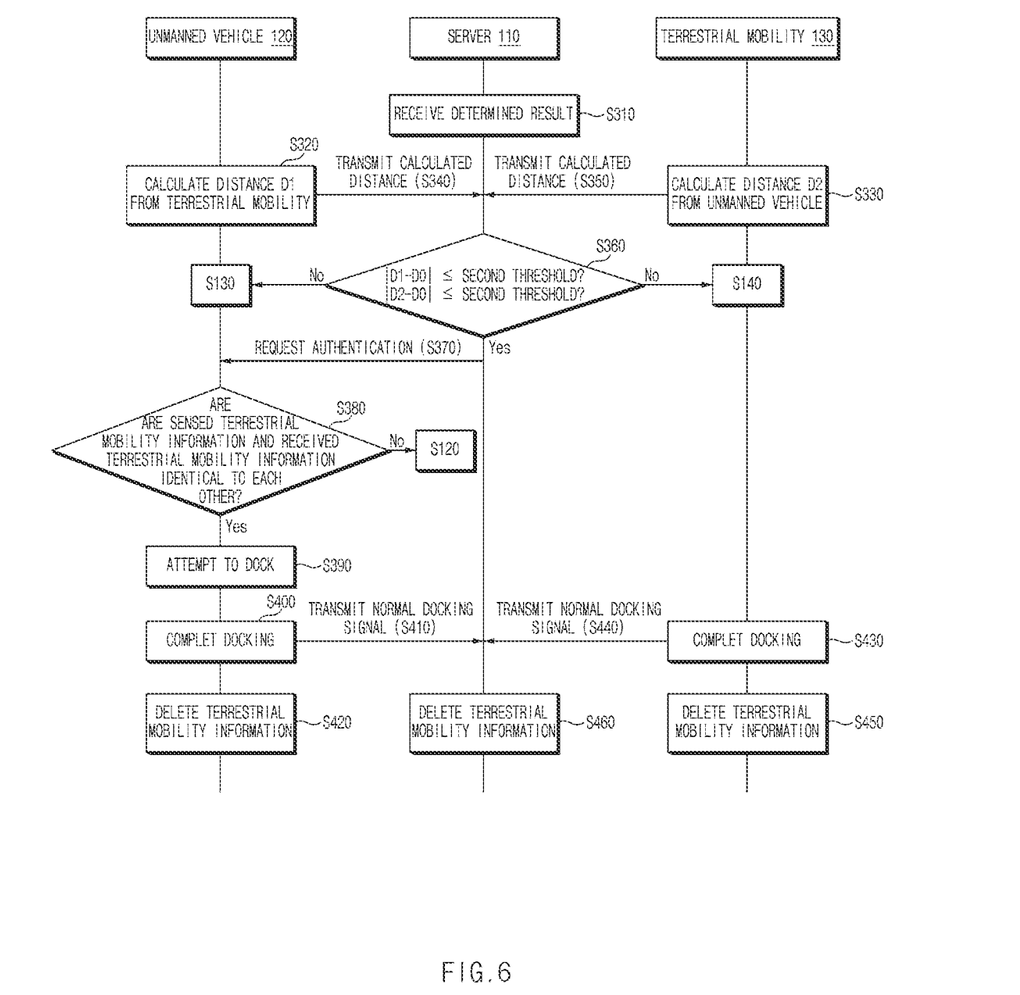

FIGS. 5 and 6 are signal sequence diagrams illustrating a method of controlling docking of an unmanned vehicle according to an embodiment of the present disclosure.

As shown in FIGS. 5 and 6, in S110, a server 110 may search for terrestrial mobility and unmanned vehicles, which are capable of docking, may specify terrestrial mobility 130 and an unmanned vehicle 120 to dock, and may transmit a docking request signal to the terrestrial mobility 130 and the unmanned vehicle 120.

In addition, in S120, the server 110 may generate, obtain, and store docking requirement information required for docking of the terrestrial mobility 130 and the unmanned vehicle 120 and may transmit the docking requirement information to the terrestrial mobility 130 and the unmanned vehicle 120. Herein, the docking requirement information may include coordinates of a docking location, a unique authentication number (e.g., a one-time unique authentication number), and terrestrial mobility information. The terrestrial mobility information may be information associated with the terrestrial mobility 130, which may include unique information (e.g., a vehicle number, a VIN, or the like) of the terrestrial mobility 130, appearance information (e.g., a vehicle type, a vehicle color, a vehicle size, or the like) of the terrestrial mobility 130, or information about a surrounding terrain in which the terrestrial mobility 130 is located. The server 110 may obtain information about a surrounding terrain based on a satellite photography map or an aerial photography map.

When receiving the docking requirement information, in S130 and S140, the unmanned vehicle 120 and the terrestrial mobility 130 may move to a docking location based on the docking location coordinates included in the docking requirement information.

In S150, the server 110 may identify real-time locations of the unmanned vehicle 120 and the terrestrial mobility 130. In S160, the server 110 may calculate a first distance between the unmanned vehicle 120 and the terrestrial mobility 130 based on the real-time locations.

In S170, the server 110 may determine whether the first distance is less than a predefined distance. Herein, the predefined distance may include a distance where it is possible for the unmanned vehicle 120 and the terrestrial mobility 130 to perform V2V communication.

When determining that the first distance is less than the predefined distance (Yes), the server 110 may request the unmanned vehicle 120 and the terrestrial mobility 130 to share the real-time locations. When determining that the first distance is not less than the predefined distance (No), the server 110 may determine that it is impossible for the unmanned vehicle 120 and the terrestrial mobility 130 to perform V2V communication and may allow the unmanned vehicle 120 and the terrestrial mobility 130 to move to the docking location again.

When the unmanned vehicle 120 and the terrestrial mobility 130 are requested to share the real-time locations from the server 110, in S180, the unmanned vehicle 120 may perform V2V communication to transmit the real-time location of the unmanned vehicle 120 to the terrestrial mobility 130. In addition, in S190, the terrestrial mobility 130 may perform V2V communication to transmit the real-time location of the terrestrial mobility 130 to the unmanned vehicle 120.

In S200, the unmanned vehicle 120 may calculate a second distance between the unmanned vehicle 120 and the terrestrial mobility 130 based on the location of the unmanned vehicle 120 and the location of the terrestrial mobility 130, which is received from the terrestrial mobility 130.

In S210, the terrestrial mobility 130 may calculate a third distance between the terrestrial mobility 130 and the unmanned vehicle 120 based on the location of the terrestrial mobility 130 and the location of the unmanned vehicle 120, which is received from the unmanned vehicle 120.

When the second distance is calculated, in S220, the unmanned vehicle 120 may transmit the second distance to the server 110. When the third distance is calculated, in S230, the terrestrial mobility 130 may transmit the third distance to the server 110.

When receiving the second distance and the third distance respectively calculated from the unmanned vehicle 120 and the terrestrial mobility 130, in S240, the server 110 may determine whether a difference between the second distance and the first distance is less than or equal to a first threshold and whether a difference between the third distance and the first distance is less than or equal to the first threshold.

When the difference between the second distance and the first distance is less than or equal to the first threshold and the difference between the third distance and the first distance is less than or equal to the first threshold in S240 (Yes), the server 110 may request the unmanned vehicle 120 and the terrestrial mobility 130 to share unique authentication numbers. Meanwhile, when the difference between the second distance and the first distance is not less than or equal to the first threshold and the difference between the third distance and the first distance is not less than or equal to the first threshold in S240 (No), the server 110 may allow the unmanned vehicle 120 and the terrestrial mobility 130 to move to the docking location again.

When receiving the request to share the unique authentication number with the terrestrial mobility 130 from the server 110, in S250, the unmanned vehicle 120 may transmit the unique authentication number, received from the server 110, to the terrestrial mobility 130 through V2V communication and may receive a unique authentication number from the terrestrial mobility 130.

In S260, the unmanned vehicle 120 may determine whether the unique authentication number received from the terrestrial mobility 130 is identical to a unique authentication number previously received from the server 110. When determining that the unique authentication number received from the terrestrial mobility 130 is identical to the unique authentication number previously received from the server 110 in S260 (Yes), in S270, the unmanned vehicle 120 may transmit the determined result to the server 110. Meanwhile, when determining that the unique authentication number received from the terrestrial mobility 130 is not identical to the unique authentication number previously received from the server 110 in S260 (No), the unmanned vehicle 120 may receive docking requirement information again.

When receiving the request to share the unique authentication number with the unmanned vehicle 120 from the server 110, in S280, the terrestrial mobility 130 may transmit the unique authentication number, received from the server 110, to the unmanned vehicle 120 through V2V communication and may receive a unique authentication number from the unmanned vehicle 120.

In S290, the terrestrial mobility 130 may determine whether the unique authentication number received from the unmanned vehicle 120 is identical to the unique authentication number previously received from the server 110. When determining that the unique authentication number received from the unmanned vehicle 120 is identical to the unique authentication number previously received from the server 110 in S290 (Yes), in S300, the terrestrial mobility 130 may transmit the determined result to the server 110. Meanwhile, when determining that the unique authentication number received from the unmanned vehicle 120 is not identical to the unique authentication number previously received from the server 110 in S290 (No), the terrestrial mobility 130 may receive docking requirement information again.

When receiving the determined results transmitted in S270 and S300 from the unmanned vehicle 120 and the terrestrial mobility 130, the server 110 may request the unmanned vehicle 120 and the terrestrial mobility 130 to share real-time locations.

When receiving the location of the terrestrial mobility 130 through V2V communication, in S320, the unmanned vehicle 120 may calculate a distance between the unmanned vehicle 120 and the terrestrial mobility 130 based on the location of the unmanned vehicle 120 and the location of the terrestrial mobility 130, which is received from the terrestrial mobility 130.

When receiving the location of the unmanned vehicle 120 through V2V communication, in S330, the terrestrial mobility 130 may calculate a distance between the terrestrial mobility 130 and the unmanned vehicle 120 based on the location of the terrestrial mobility 130 and the location of the unmanned vehicle 120, which is received from the unmanned vehicle 120.

In S340, the unmanned vehicle 120 may transmit the distance calculated in S320 to the server 110. In S350, the terrestrial mobility 130 may transmit the distance calculated in S330 to the server 110.

When receiving the distance transmitted in S340 from the unmanned vehicle 120 and receiving the distance transmitted in S350 from the terrestrial mobility 130, in S360, the server 110 may determine whether the difference between the second distance and the first distance is less than or equal to a second threshold and whether the difference between the third distance and the first distance is less than or equal to the second threshold. Herein, the second threshold may be less than or equal to the first threshold, and the second threshold may refer to a minimum distance where it is possible for the unmanned vehicle 120 to obtain terrestrial mobility information.

According to an embodiment, when determining that the difference between the second distance and the first distance is less than or equal to the second threshold and that the difference between the third distance and the first distance is less than or equal to the second threshold in the S360 (Yes), in S370, the server 110 may transmit a control signal requesting authentication to the unmanned vehicle 120. Meanwhile, when the difference between the second distance and the first distance is not less than or equal to the second threshold and the difference between the third distance and the first distance is not less than or equal to the second threshold in S360 (No), the server 110 may allow the unmanned vehicle 120 and the terrestrial mobility 130 to move to the docking location again.

When receiving the request for authentication for docking from the server 110, in S380, the unmanned vehicle 120 may determine whether the previously received terrestrial mobility information and the terrestrial mobility information sensed by the sensor 122 are identical to each other.

According an embodiment, in the S380, the unmanned vehicle 120 may determine whether unique information (e.g., a vehicle number) of terrestrial mobility, which is sensed by the sensor 122, is identical to previously obtained unique information of the terrestrial mobility 130. Furthermore, the unmanned vehicle 120 may determine whether an appearance shape of the terrestrial mobility, which is sensed by the sensor 122, and a previously obtained appearance shape of the terrestrial mobility 130 are identical to each other. Furthermore, the unmanned vehicle 120 may determine whether terrain information around the terrestrial mobility 130, which is sensed by the sensor 122, is identical to previously received terrain information around the terrestrial mobility 130.

When determining that the previously received terrestrial mobility information and the terrestrial mobility information sensed by the sensor 122 are identical to each other in S380 (Yes), in S390, the unmanned vehicle 120 may determine the terrestrial mobility 130 as a docking target and may attempt to dock with the terrestrial mobility 130. Meanwhile, when determining that the previously received terrestrial mobility information and the terrestrial mobility information sensed by the sensor 122 are not identical to each other in S380 (No), the unmanned vehicle 120 may receive docking requirement information again.

According an embodiment, in S390, the unmanned vehicle 120 may land in an area where a certain area of the terrestrial mobility 130 is ensured and may attempt to dock with the terrestrial mobility 130. As an example, the unmanned vehicle 120 may land in an area having a width and length of certain centimeters (cm) and may land on the roof, hood, or the like to attempt to dock.

When the docking is completed in S400, in S410, the unmanned vehicle 120 may transmit a normal docking signal to the server 110. In S420, the unmanned vehicle 120 may delete previously received terrestrial mobility information.

When the docking is completed in S430, in S440, the terrestrial mobility 130 may transmit a normal docking signal to the server 110. In S450, the terrestrial mobility 130 may delete previously received terrestrial mobility information.

When receiving the normal docking signals from the unmanned vehicle 120 and the terrestrial mobility 130, in S460, the server 110 may delete terrestrial mobility information.

Furthermore, according to another embodiment, when the difference between the second distance and the first distance is less than or equal to the second threshold and the difference between the third distance and the first distance is less than or equal to the second threshold, the server 110 may receive terrestrial mobility information detected by the unmanned vehicle 120 from the unmanned vehicle 120. The server 110 may determine whether the terrestrial mobility information detected by the unmanned vehicle 120 and previously obtained terrestrial mobility information are identical to each other.

According an embodiment, the server 110 may determine whether unique information (e.g., a vehicle number) of terrestrial mobility, which is detected by the unmanned vehicle 120, and previously obtained unique information of the terrestrial mobility 130 are identical to each other. Furthermore, the server 110 may determine whether an appearance shape of the terrestrial mobility, which is detected by the unmanned vehicle 120, and a previously obtained appearance shape of the terrestrial mobility 130 are identical to each other. Furthermore, the server 110 may determine whether terrain information around the terrestrial mobility 130, which is detected by the unmanned vehicle 120, and previously obtained terrain information around the terrestrial mobility 130 are identical to each other.

When determining that the terrestrial mobility information detected by the unmanned vehicle 120 and the previously obtained terrestrial mobility information are identical to each other, the server 110 may transmit a control signal for causing the unmanned vehicle 120 to attempt to dock with the terrestrial mobility to the unmanned vehicle 120.

Figure 7:
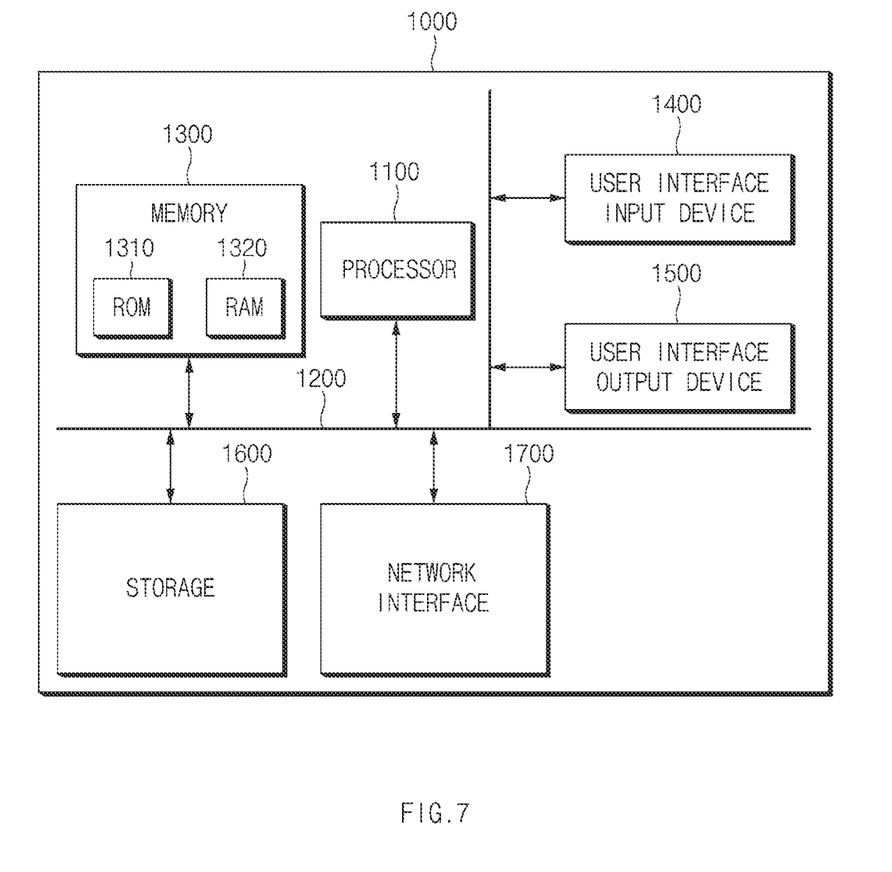
FIG. 7 is a block diagram illustrating a configuration of a computing system for executing the method according to an embodiment of the present disclosure.

FIG. 7 is a block diagram illustrating a configuration of a computing system for executing the method according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

According to an exemplary embodiment of the present disclosure, the computing system 1000 may include a processor (e.g., computer, microprocessor, CPU, ASIC, circuitry, logic circuits, etc.) and an associated non-transitory memory storing software instructions which, when executed by the processor, provides the functionalities of the at least one processor 1100, the user interface input device 1400 and the user interface output device 1500. Herein, the memory and the processor may be implemented as separate semiconductor circuits. Alternatively, the memory and the processor may be implemented as a single integrated semiconductor circuit. The processor may embody one or more processor(s).

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The system and the method for controlling the docking of the unmanned vehicle according to an embodiment of the present disclosure may allow the unmanned vehicle to accurately recognize terrestrial mobility such that the unmanned vehicle and the terrestrial mobility safely dock with each other.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system for controlling docking of an unmanned vehicle, the system comprising:
   a terrestrial mobility movable on the ground;
   an unmanned vehicle configured to detect the terrestrial mobility; and
   a server configured to transmit a docking request signal to the terrestrial mobility and the unmanned vehicle to dock, receive information for a plurality of authentication from the terrestrial mobility and the unmanned vehicle, and control the unmanned vehicle to dock with the terrestrial mobility based on the information for the plurality of authentication.

2. The system of claim 1, wherein the server transmits docking requirement information to the unmanned vehicle and the terrestrial mobility, after transmitting the docking request signal.

3. The system of claim 2, wherein the docking requirement information includes docking location coordinates, a unique authentication number, and terrestrial mobility information.

4. The system of claim 3, wherein the server determines whether a first distance between the unmanned vehicle and the terrestrial mobility is less than a predefined distance, when the unmanned vehicle and the terrestrial mobility move to a docking location.

5. The system of claim 4, wherein the predefined distance includes a distance where it is possible for the unmanned vehicle and the terrestrial mobility to perform vehicle-to-vehicle (V2V) communication.

6. The system of claim 4, wherein the unmanned vehicle calculates a second distance from the terrestrial mobility, when moving to the docking location.

7. The system of claim 6, wherein the terrestrial mobility calculates a third distance from the unmanned vehicle, when moving to the docking location.

8. The system of claim 7, wherein the server requests the unmanned vehicle and the terrestrial mobility to share unique authentication numbers, when a difference between the second distance and the first distance is less than or equal to a first threshold and a difference between the third distance and the first distance is less than or equal to the first threshold.

9. The system of claim 8, wherein the unmanned vehicle receives a unique authentication number from the terrestrial mobility through V2V communication, determines whether the unique authentication number previously received from the server and the unique authentication number received from the terrestrial mobility are identical to each other, and in response to determination that the unique authentication number previously received from the server and the unique authentication number received from the terrestrial mobility are identical to each other, the unmanned vehicle transmits a determined result to the server.

10. The system of claim 9, wherein the terrestrial mobility receives a unique authentication number from the unmanned vehicle through V2V communication, determines whether the unique authentication number previously received from the server and the unique authentication number received from the unmanned vehicle are identical to each other, and in response to determination that the unique authentication number previously received from the server and the unique authentication number received from the unmanned vehicle the terrestrial mobility transmits a determined result to the server.

11. The system of claim 10, wherein the server determines whether the difference between the second distance and the first distance is less than or equal to a second threshold and whether the difference between the third distance and the first distance is less than or equal to the second threshold, when receiving the determined results.

12. The system of claim 11, wherein the server transmits a control signal requesting authentication for docking to the unmanned vehicle, when the difference between the second distance and the first distance is less than or equal to the second threshold and the difference between the third distance and the first distance is less than or equal to the second threshold.

13. The system of claim 12, wherein the unmanned vehicle determines whether terrestrial mobility information received from the server and terrestrial mobility information detected by the unmanned vehicle are identical to each other.

14. The system of claim 13, wherein in response to determination that the terrestrial mobility information received from the server and the terrestrial mobility information detected by the unmanned vehicle are identical to each other, the unmanned vehicle determines the terrestrial mobility as a target to dock and attempts to dock with the terrestrial mobility.

15. The system of claim 11, wherein the server receives the terrestrial mobility information detected by the unmanned vehicle from the unmanned vehicle, when the difference between the second distance and the first distance is less than or equal to the second threshold and the difference between the third distance and the first distance is less than or equal to the second threshold.

16. The system of claim 15, wherein the server determines whether the terrestrial mobility information detected by the unmanned vehicle and terrestrial mobility information obtained by the server are identical to each other.

17. The system of claim 16, wherein the server transmits a control signal for causing the unmanned vehicle to attempt to dock with the terrestrial mobility to the unmanned vehicle, when determining that the terrestrial mobility information detected by the unmanned vehicle and the terrestrial mobility information obtained by the server are identical to each other.

18. The system of claim 1, wherein the unmanned vehicle transmits a normal docking complete signal to the server, when docking with the terrestrial mobility is completed.

19. The system of claim 18, wherein the terrestrial mobility transmits a normal docking complete signal to the server, when docking with the unmanned vehicle is completed.

20. A method for controlling docking of an unmanned vehicle, the method comprising:
transmitting, by a server, a docking request signal to terrestrial mobility and an unmanned vehicle to dock;
receiving, by the server, information for a plurality of authentication from the terrestrial mobility and the unmanned vehicle; and
controlling, by the server, the unmanned vehicle to dock with the terrestrial mobility based on the plurality of authentication.

* * * * *